June 9, 1936. C. J. KOHLER 2,043,668
DIVERTER VALVE
Filed July 29, 1935
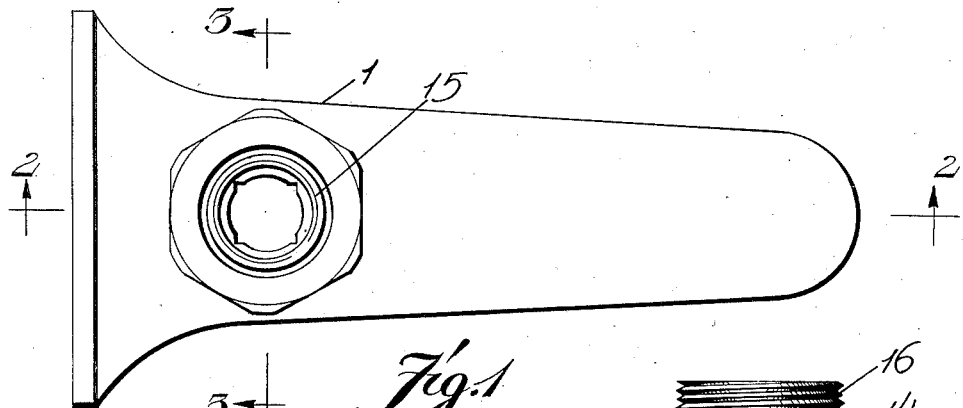
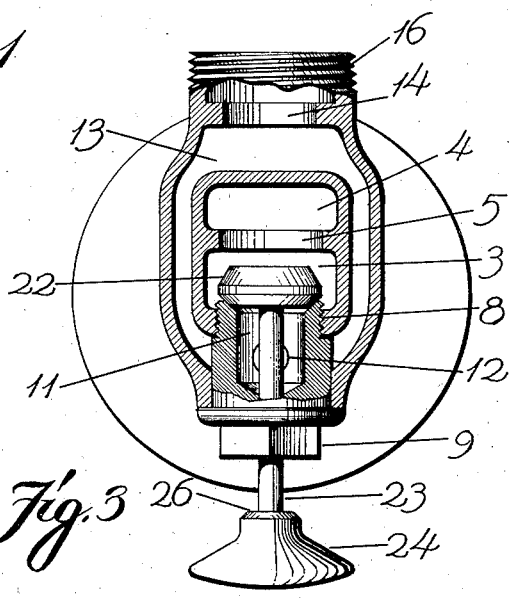
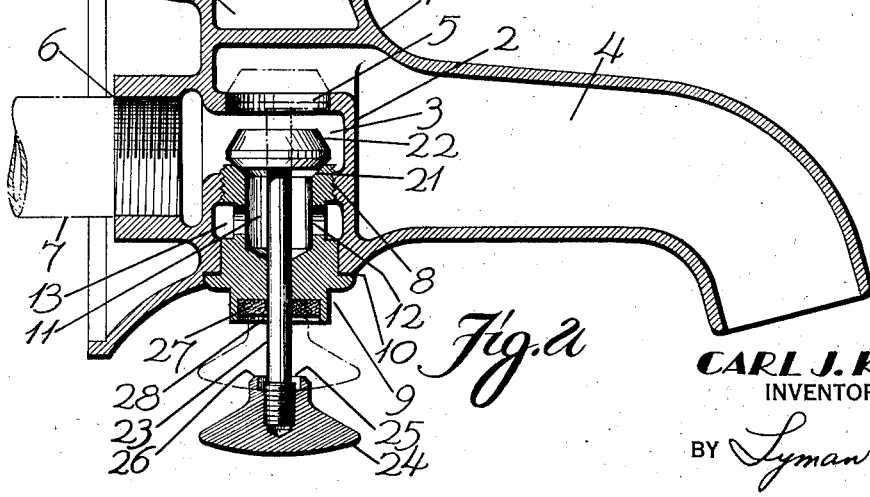
CARL J. KOHLER
INVENTOR
BY Lyman C. Conger
ATTORNEY Patented June 9, 1936

2,043,668

UNITED STATES PATENT OFFICE 2,043,668

DIVERTER VALVE

Carl J. Kohler, Kohler, Wis.

Application July 29, 1935, Serial No. 33,681

3 Claims. (Cl. 251—22)

My invention relates to improvements in diverter valves, and the objects of my invention are to provide a diverter valve which will be maintained in one position by water pressure and in another position by gravity, to position the operating mechanism thereof in such a position as not to be unsightly, and to prevent leakage around the operating mechanism.

I attain these objects by the construction illustrated in the accompanying drawing, in which Figure 1 is a plan view of a diverter valve embodying my invention; Figure 2, a vertical sectional view thereof taken along the lines 2—2 of Figure 1, and Figure 3, a sectional view thereof taken along the lines 3—3 of Figure 1.

Similar numerals refer to similar parts throughout the several views.

The diverter mechanism is preferably formed as a unit with the discharge spout, and is so illustrated; however, it will be apparent that the diverter mechanism may be positioned apart from the discharge spout if desired.

In the drawing the numeral 1 indicates the frame or body which is divided by the wall or partition 2 to form the chamber 3 and the discharge passageway or spout 4. A port 5 provides communication between the chamber 3 and the spout 4. The chamber 3 is provided with the threaded aperture 6 to receive the supply pipe 7 which is connected to a mixer or other suitable source of water supply not shown.

The chamber 3 is likewise provided with the threaded aperture 8 normally closed by the threaded plug 9, a gasket 10 being interposed between the plug and the body to prevent leakage.

The plug 9 is provided with a longitudinally extending channel 11 which communicates with the transverse, externally opening bores 12. The bores 12 open into a chamber 13 which extends around the chamber 3 and has communication through the port 14 with the discharge pipe 15 which leads to a shower head or similar discharge apparatus, not shown.

The body 1 is threaded at 16 to permit the attachment of the pipe 15 by a suitable coupling such as that shown, which comprises the threaded sleeve 17, ball joint 18, and gaskets 19 and 20.

The inner end of plug 9 is formed into a valve seat 21 adapted to receive the valve 22 which in one position seats thereon and in another position, shown by the dot and dash lines in Figure 2, extends into the port 5.

It will be noted that the valve 22 does not seat on the body adjacent the port 5 but extends therein, the valve 22 fitting the port 5 as closely as is practicable without causing undue friction and binding of the valve.

The valve 22 is attached to the valve stem which extends through and is slidably mounted in the plug 9. The valve stem 23 terminates in the operating knob 24 which is provided adjacent the valve stem 23 with a bore 25 of greater diameter than the valve stem 23. The knob 24 is tapered upwardly and inwardly adjacent the bore 25 to form an annular edge 26 which, in the upper position of the valve, abuts a gasket 27 of resilient material seated in a recess 28 of the plug 9.

When the valve 22 is in the position shown in full lines in Figure 2, water from the supply pipe 7 passes through chamber 3, port 5, and out discharge spout 4.

Should the operator desire to divert the flow of water, for example from a tub to a shower, the valve 22 is raised manually to the position shown in dot and dash lines in Figure 2. The discharge of water from spout 4 is interrupted due to the blocking of port 5 and the water now passes through channel 11, bores 12, chamber 13 and out port 14 into pipe 15.

Once the valve 22 is set in the upper position it will be maintained in that position by the pressure of the water on the under side of the valve as long as water is supplied under pressure through the supply pipe 7. However, if the water supply is shut off, the valve 22, being no longer maintained by water pressure, is returned by the action of gravity to the position shown in full lines in Figure 2.

Thus the valve is automatically set for discharge through the spout 4 whenever the water supply is turned off.

The operating knob 24 is located beneath the body 1, a position in which it does not detract from the appearance of the fitting.

The water pressure on the under side of the valve 22 when in the raised position draws the edge 26 of the operating knob 24 into firm contact with the gasket 27 preventing leakage around the valve stem 23. Since the valve 22 is fully movable within the port 5 and its upward movement is limited only by the contact between the operating knob and the gasket 27, a firm and leak-proof connection is obtained at all times even though the gasket 27 becomes somewhat worn.

The entire operating mechanism is mounted on the plug 9 and may be removed therewith as a unit for replacement or repair.

I claim:

1. In a diverter valve, the combination of a body, a wall dividing said body into a chamber and a discharge passageway, said chamber communicating with a source of water supply, a port providing communication between said chamber and said discharge passageway, a second chamber adjacent said first mentioned chamber and communicating with a discharge pipe, a plug having threaded engagement with said body, a bore in said plug providing communication between said first mentioned chamber and said second mentioned chamber, a valve having a sliding fit within said port and adapted in one position to close said port and in the alternative position to close said bore, said valve being maintained in said first mentioned position by water pressure and caused to assume said second mentioned position by gravity upon cessation of the water pressure, a valve stem attached to said valve and slidably fitting in said plug, a gasket in said plug, an operating knob on said valve stem and a tapered surface on said operating knob circumjacent said valve stem and adapted to engage said gasket when said valve is in said first mentioned position, said plug, valve, valve stem and operating rod being removable as a unit.

2. In a diverter valve the combination of a valve adapted to be held in one position of adjustment by water pressure and caused to assume an alternate position by gravity upon cessation of the water pressure, a valve stem attached to said valve, a gasket positioned in said body circumjacent said valve stem, an operating knob on said valve stem and a tapered surface on said operating knob circumjacent said valve stem and adapted to engage said gasket to prevent leakage around said valve stem when said valve is in the first mentioned position, said tapered surface being held in engagement with said gasket by water pressure on said valve when in said first-mentioned position.

3. In a valve the combination of a body, a wall dividing said body into a chamber and a discharge passageway, said chamber communicating with a source of water supply, a port providing communication between said chamber and said discharge passageway, a valve adapted in one position to slidingly fit within said port and to interrupt communication between said chamber and said discharge passageway, said valve being maintained in said position by water pressure, a valve stem attached to said valve, an operating knob on said valve stem, a tapered surface on said operating knob adapted to engage a gasket and prevent leakage around said valve stem when said valve is in the position aforesaid, said tapered surface being held in engagement with said gasket by water pressure on said valve.

CARL J. KOHLER.